United States Patent
Lee et al.

(10) Patent No.: US 12,463,286 B2
(45) Date of Patent: Nov. 4, 2025

(54) BATTERY MODULE

(71) Applicant: SK ON CO., LTD., Seoul (KR)

(72) Inventors: Jong Hyuk Lee, Daejeon (KR); Su Hee Han, Daejeon (KR); Hee Gyoung Kang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/204,996

(22) Filed: Jun. 2, 2023

(65) Prior Publication Data

US 2023/0307779 A1    Sep. 28, 2023

Related U.S. Application Data

(63) Continuation of application No. 17/183,440, filed on Feb. 24, 2021, now Pat. No. 11,710,874.

(30) Foreign Application Priority Data

Feb. 25, 2020   (KR) .................. 10-2020-0023129

(51) Int. Cl.
| | |
|---|---|
| *H01M 50/342* | (2021.01) |
| *H01M 10/42* | (2006.01) |
| *H01M 10/48* | (2006.01) |
| *H01M 50/507* | (2021.01) |

(52) U.S. Cl.
CPC ..... *H01M 50/342* (2021.01); *H01M 10/4228* (2013.01); *H01M 10/482* (2013.01); *H01M 50/507* (2021.01); *H01M 2200/20* (2013.01)

(58) Field of Classification Search
CPC ........... H01M 50/342; H01M 10/4228; H01M 10/482; H01M 50/507; H01M 2200/20; H01M 2220/20; H01M 50/3425; H01M 10/48; H01M 50/572; Y02E 60/10; G01N 33/004

See application file for complete search history.

(56) References Cited

U.S. PATENT DOCUMENTS

| | | | |
|---|---|---|---|
| 9,088,034 | B2 | 7/2015 | Ahn et al. |
| 9,461,344 | B2 | 10/2016 | Lee et al. |
| 2009/0305116 | A1 | 12/2009 | Yang et al. |
| 2010/0247997 | A1 | 9/2010 | Hostler et al. |

(Continued)

FOREIGN PATENT DOCUMENTS

| | | |
|---|---|---|
| CN | 204793006 U | 11/2015 |
| CN | 109686896 A | 4/2019 |

(Continued)

*Primary Examiner* — Lisa S Park
(74) *Attorney, Agent, or Firm* — The Webb Law Firm (57) ABSTRACT

A battery module according to an embodiment of the present invention includes a battery stack in which a plurality of battery cells including a cathode tab and an anode tab are stacked; a first bus bar assembly including a first bus bar connecting cathode tabs and anode tabs located at one end of the battery stack; and a second bus bar assembly including a second bus bar connecting cathode tabs and anode tabs located at the other end of the battery stack. The first bus bar assembly or the second bus bar assembly may include a venting part including at least one venting knife which protrudes from the first bus bar or the second bus bar toward the battery cell, such that stability of the battery module may be improved.

20 Claims, 6 Drawing Sheets

(56) References Cited

U.S. PATENT DOCUMENTS

2010/0248010 A1    9/2010   Butt et al.
2011/0129702 A1    6/2011   Ahn et al.

FOREIGN PATENT DOCUMENTS

| | | | |
|---|---|---|---|
| CN | 110311185 | A | 10/2019 |
| CN | 209641723 | U | 11/2019 |
| CN | 209675374 | U | 11/2019 |
| GB | 2504094 | A | 1/2014 |
| JP | 2007141778 | A | 6/2007 |
| JP | 2010186786 | A | 8/2010 |
| JP | 5404527 | * | 2/2014 |
| KR | 101093937 | B1 | 12/2011 |
| KR | 101097101 | B1 | 12/2011 |
| KR | 101355961 | B1 | 2/2014 |
| KR | 101452028 | B1 | 10/2014 |
| KR | 20170038497 | A | 4/2017 |
| WO | 2011132723 | A1 | 10/2011 |

\* cited by examiner

BATTERY MODULE

CROSS-REFERENCE TO RELATED APPLICATIONS

This application is a continuation of U.S. patent application Ser. No. 17/183,440, filed Feb. 24, 2021, which claims priority to Korean Patent Application No. 10-2020-0023129 filed Feb. 25, 2020, the disclosures of which are hereby incorporated by reference in their entireties.

BACKGROUND OF THE INVENTION

1. Field of the Invention

The present invention relates to a battery module, and more specifically, to a battery module including a plurality of battery cells.

2. Description of the Related Art

Secondary batteries have been proposed as a solution to solve air pollution, etc. caused by vehicles such as gasoline vehicles and diesel vehicles which use fossil fuels, and have been in the spotlight as a power source for electric vehicles (EV), hybrid electric vehicles (HEV) and the like.

However, when a large current flows in the conventional secondary battery within a short time due to exposure to high temperature, overcharging, external short circuit, nail penetration, local crush, etc., the battery is exposed to a risk of ignition/explosion while being heated by IR heat generation. Specifically, when the temperature of the battery is increased, a reaction between an electrolyte and an electrode is accelerated, and as a result, heat of reaction is generated to cause an additional increase in the temperature of the battery, which in turn accelerates the reaction between the electrolyte and the electrode. In addition, as a result of the reaction between the electrolyte and the electrode, a gas is generated to increase an internal pressure of the battery, and the secondary battery may explode above a certain pressure. As a method for preventing such an explosion of the secondary battery, there are a method for mounting and using an element on an outside of a cell, and a method for using a material inside the cell.

However, in the case of the method for mounting the element on the outside of the cell, it is not possible to properly protect the battery against a test that requires fast response time, and in the case of the method for using the material inside the cell, it is difficult to expect a reliable protection effect, and thereby causing a deterioration in performances of the battery.

For example, Korean Patent Registration Publication No. 10-1355961 discloses a battery module that cools a battery pack using a cooling medium, but in this case, it is difficult to expect an effect of preventing instantaneous explosion.

PRIOR ART DOCUMENT

Patent Document

Korean Patent Registration Publication No. 10-1355961 (published on Jan. 21, 2014)

SUMMARY OF THE INVENTION

It is an object of the present invention to provide a battery module having improved safety.

According to an aspect of the present invention, there is provided a battery module including: a battery stack in which a plurality of battery cells including a cathode tab and an anode tab are stacked; and a bus bar assembly which includes bus bars connecting at least one of a plurality of cathode tabs and anode tabs located at at least one end of the battery stack, wherein the bus bar assembly includes a venting part including at least one venting knife which protrudes from the bus bars toward the battery cell.

For example, the venting knife included in the venting part may be integrally formed with the bus bar.

For example, the venting part may further include a knife support part for supporting the venting knife.

For example, the knife support part included in the venting part may be integrally formed with the bus bar.

For example, the bus bar may include a slit into which the venting knife is inserted, and the venting part may be coupled with the bus bar so that the knife support part is disposed on an outside of the bus bar and the venting knife passes through the slit to protrudes toward the battery cell.

For example, the battery module may further include a sensing unit configured to monitor states of the battery cells.

For example, the sensing unit may include a pressure sensor which senses a pressure in the battery cell.

For example, the battery module may further include a signal transmission unit which transmits a pressure exceeding signal to a user, when the pressure in the battery cell measured by the pressure sensor exceeds a primary designated pressure.

For example, the battery module may further include actuation parts which are located between the bus bars and the battery stack, and are configured to further protrude the venting knives toward the battery cell, when the pressure in the battery cell measured by the pressure sensor exceeds a secondary designated pressure having a value greater than the primary designated pressure.

For example, the actuation part may include an elastic member and a knife support part.

For example, the sensing unit may further include a gas detection sensor which detects a gas leaked from a venting hole formed by the venting part.

For example, the gas detection sensor may be coupled with the bus bar assembly.

In the battery module according to exemplary embodiments of the present invention, the bus bar assembly may include the venting knife to prevent explosion of the battery module due to overcharging.

For example, when the battery cell is expanded due to overcharging, etc., a venting hole is formed in a surface of the battery cell by the venting knife included in the bus bar assembly, and explosion of the battery module may be prevented by the venting hole.

The battery module according to the exemplary embodiments of the present invention may include a gas detection sensor to more quickly detect a gas flowing out from the venting hole formed by the venting knife. Thereby, explosion of the battery module can be prevented.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

Embodiments of the present invention provide a battery module which includes a bus bar assembly including venting knives. Thereby, in the battery module, since a gas formed inside the battery cell is leaked through a venting hole formed by the venting knife, it is possible to effectively prevent explosion of the battery module.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

Figure 1:
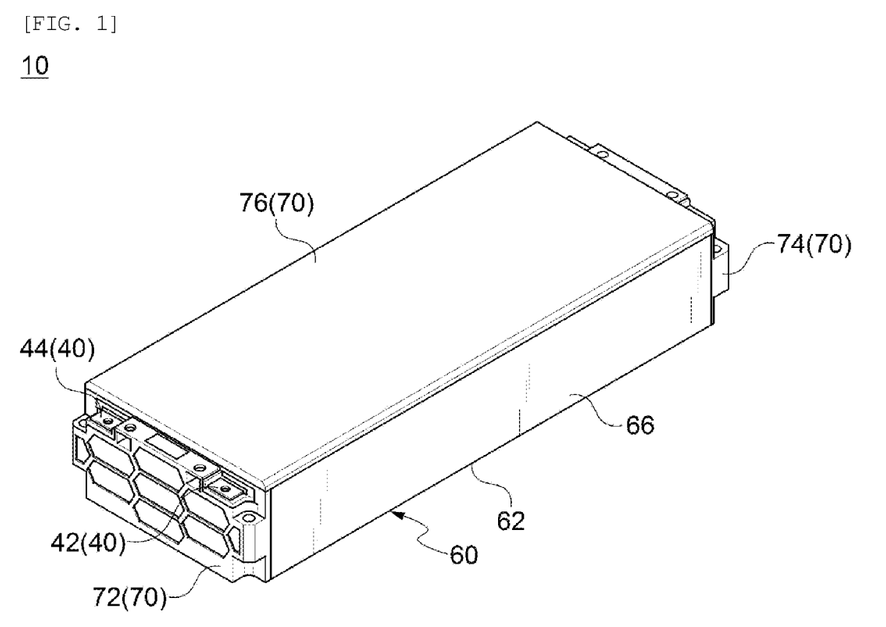
FIG. 1 is a perspective view illustrating a battery module according to an embodiment of the present invention.
Figure 2:
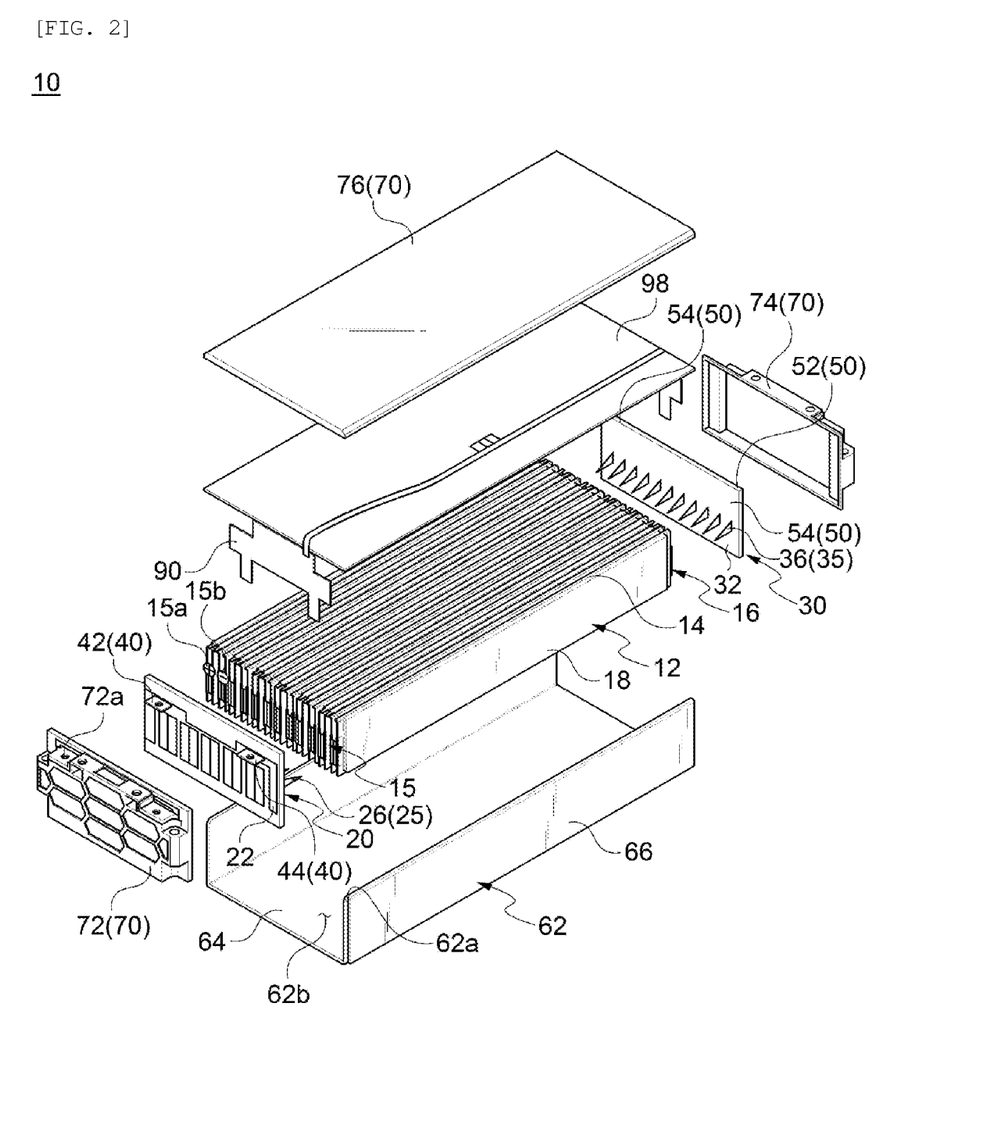
FIG. 2 is an exploded perspective view illustrating the battery module according to an embodiment of the present invention.

FIG. 1 is a perspective view of a battery module according to an embodiment of the present invention, and FIG. 2 is an exploded perspective view of the battery module according to an embodiment of the present invention.

A battery module 10 may include: a battery stack 12 formed by stacking battery cells 14; bus bar assemblies 20 and 30 which electrically connect the battery cells 14 forming the battery stack 12 to each other; and a module case 60 in which the battery stack 12 and the bus bar assemblies 20 and 30 are housed and protected.

The bus bar assemblies 20 and 30 may include bus bars 22 and 32, and venting parts 25 and 35 including venting knives 26 and 36.

The bus bar assemblies 20 and 30 may include a first bus bar assembly 20 disposed at one end of the battery module 10 and a second bus bar assembly 30 disposed at the other end of the battery module 10. The first and second bus bar assemblies 20 and 30 may be disposed at one end and the other end of the battery module 10 to be spaced apart from each other to form independent cathode terminals 42 and 52 and anode terminals 44 and 54, respectively.

The bus bars 22 and 32 are formed at both ends of the battery stack 12, and may electrically connect electrode tabs 15 and 16 of a plurality of battery cells 14. The bus bars 22 and 32 may be coupled to one end and the other end of the battery stack 12, respectively, thus to allow the electrode tabs 15 and 16 respectively formed at both ends of the battery cell 14 to be electrically connected to each other.

The first bus bar assembly 20 may include a first bus bar 22 and a first venting knife 26. The electrode tabs 15 located at one end of the battery stack 12 may be connected in series to each other through the first bus bar 22. For example, a cathode tab 15a and an anode tab 15b located at one end of the battery stack 12 may be connected in series to each other through the first bus bar 22.

The second bus bar assembly 30 may include a second bus bar 32 and a second venting knife 36. The electrode tabs 16 located at the other end of the battery stack 12 may be connected in series to each other through the second bus bar 32. For example, a cathode tab 16a and an anode tab 16b located at the other end of the battery stack 12 may be connected in series to each other through the second bus bar 32.

Each of the first and second bus bars 22 and 32 may include a terminal plate. The terminal plate may be electrically connected to the bus bars 22 and 32 to form the cathode terminals 42 and 52 and the anode terminals 44 and 54.

For example, the terminal plate may be provided to be coupled to the bus bars 22 and 32 as a separate component. For example, the terminal plate may be integrally formed with the bus bars 22 and 32. For example, the bus bars may be coupled to both of upper and lower portions of the terminal plate.

The terminal plate is provided so as to form terminals 40 and 50 which are electrically connected to the bus bars 22 and 32 and are exposed to an outside. The terminal plate may form a first cathode terminal 42 and a first anode terminal 44 at one end of the battery stack 12, and may form a second cathode terminal 52 and a second anode terminal 54 at the other end of the battery stack 12. In the present disclosure, the first cathode terminal 42 and the first anode terminal 44 may be defined as a first terminal 40, and the second cathode terminal 52 and the second anode terminal 54 may be defined as a second terminal 50.

For example, the first and second cathode terminals 42 and 52 and the first and second anode terminals 44 and 54 may include terminals having the same polarity as each other in a longitudinal direction of the battery module 10. For example, the first and second cathode terminals 42 and 52 and the first and second anode terminals 44 and 54 may be symmetrically disposed on both ends of the battery module 10. When the cathode terminals 42 and 52 closely face one side forming a length of the battery module 10, the anode terminals 44 and 54 may be disposed close to the other side of the battery module 10.

The battery module 10 may be formed to have a width in a width direction perpendicular to the length direction smaller than a length in a length direction from the first terminal 40 toward the second terminal 50. For example, the battery module 10 has a length longer than a width, and the cathode terminals 42 and 52 and the anode terminals 44 and 54 may be disposed at both ends thereof in the longitudinal direction, respectively.

The module case 60 may form an exterior of the battery module 10. The module case 60 may include a case body 62 forming a placing space 62b and a case cover 70 coupled to the case body 62. The case body 62 may include an opening 62a communicating with the placing space 62b, and the case cover 70 may be configured to cover the opening 62a. The case cover 70 may include a front cover 72 and a rear cover 74 coupled to the front and rear of the case body 62, and an upper cover 76 coupled to an upper portion of the case body 62.

The front and rear covers 72 and 74 may be configured to be coupled to the outside of the bus bar assemblies 20 and 30, so as to cover the bus bar assemblies 20 and 30, respectively. The case cover 70 may further include an insulation cover disposed between the front and rear covers 72 and 74 and the bus bar assemblies 20 and 30. For example, the insulation cover may be made of an insulation material.

The front and rear covers 72 and 74 may include an opening part 72a which is opened so that the terminals are exposed to the outside. The cathode terminals 42 and 52 and the anode terminals 44 and 54 included in the bus bar assemblies 20 and 30 may be exposed to the outside of the front and rear covers 72 and 74 through the opening parts 72a, respectively.

The case body 62 may include a lower case 64 forming a lower surface, and side cases 66 extending upward from the lower case 64 to form side surfaces. In the present embodiment, the case body 62 may be provided to have a 'U-shaped' cross section, so that front, rear and upper sides thereof are opened to the outside. Alternately, the case body 62 may be provided to have a 'rectangle-shaped' cross section, so that the front and rear sides thereof are opened to the outside, for example. The case body 62 may have a structure forming the placing space 62b in which the plurality of battery cells 14 are placed.

The case body 62 and the case cover 70 may protect the respective components such as the battery stack 12, and the bus bars 22 and 32 and the terminals, etc., which are electrically connected to each other in the battery module 10.

The battery module 10 may include cooling members (not illustrated). Although not illustrated in the drawings, the cooling members may be disposed to cover the case body 62 and the case cover 70, and thereby allowing the battery cell 14 to be cooled in multiple directions. For example, in the battery module 10, since the first and second terminals 40 and 50 operate independently, a separate component for electrically connecting the first and second terminals 40 and 50 may be omitted, so that the cooling members may be freely disposed.

For example, the cooling members may be disposed on at least one of the lower case 64, the side cases 66 and the upper cover 76. For example, the cooling members may be configured in surface contact with at least one of the lower case 64, the side cases 66 and the upper cover 76.

The battery module 10 may further include a sensing unit 90 to be described below.

Figure 3:
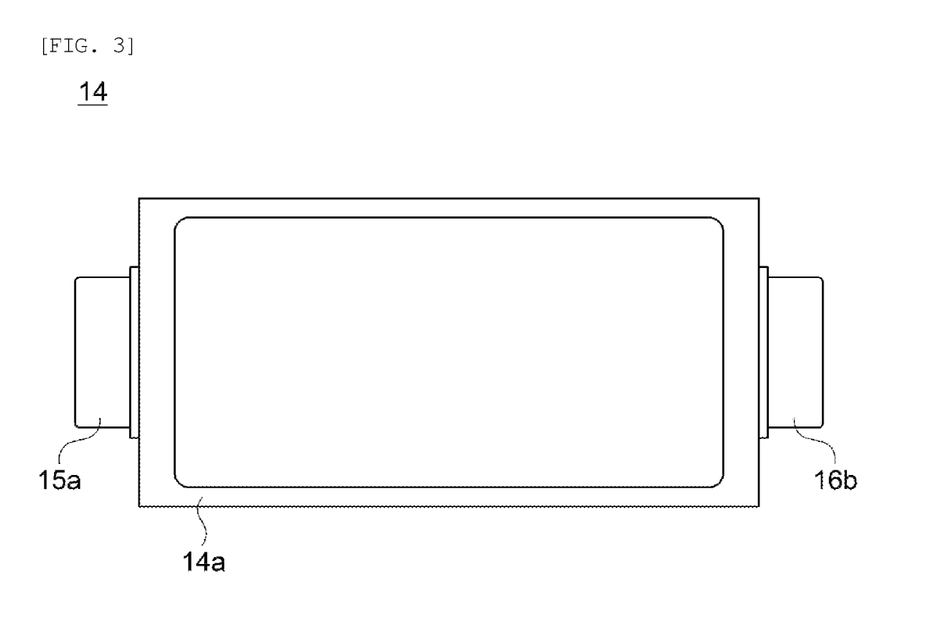
FIG. 3 is a schematic model diagram illustrating a battery cell according to an embodiment of the present invention.

FIG. 3 is a schematic model diagram illustrating the battery cell according to an embodiment of the present invention.

The battery cell 14 may be formed to have a long width or an ultra-long width, that is, a distance between the electrode tabs is longer than the length of the edges where the electrode tabs 15 are located.

The battery cells 14 may include an electrode assembly (not illustrated) from which the electrode tabs 15 and 16 are drawn out, and an outer case 14a in which the electrode assembly is housed. The electrode assembly may be formed in a wound type in which one or more cathode plates and anode plates are wound together with a separator, or a stack type in which a plurality of cathode plates and a plurality of anode plates are alternately stacked with a separator interposed therebetween. The outer case 14a may be configured to include an outer insulation layer, a metal layer, and an inner adhesive layer, to house internal components such as the electrode assembly and an electrolyte.

The cathode tab 15a and the anode tab 16b may be formed at both ends of the battery cell 14 one by one. For example, the cathode tab 15a and the anode tab 16b may be formed only at one end of the battery cell 14. Alternatively, the cathode tabs 15a and 16a and the anode tabs 15b and 16b may be respectively formed at both ends of the battery cell 14, for example.

The battery stack 12 may be formed by stacking the plurality of battery cells 14. In the battery stack 12, in order to obtain a voltage higher than that of a single battery cell 14, the electrode tabs 15 and 16 may be connected in series to each other by the bus bar assemblies 20 and 30.

As a non-limiting example of an arrangement and a stacking direction of the battery cells 14, the battery cells 14 are arranged so that the cathode tab 15 and the anode tab 16 are alternately stacked in the stacking direction, and are stacked in a width direction of the battery module 10 to form the battery stack 12. For example, the battery cells 14 may be arranged so that two cathode tabs 15 and two anode tabs 16 are alternately stacked in the stacking direction, and are stacked in the width direction of the battery module 10 to form the battery stack 12.

The battery stack 12 may include a buffer member 18 disposed on the outermost side thereof and arranged between an inner surface of the side case 66 and the battery cell 14 on the outermost side thereof to perform a buffer function.

Figure 4:
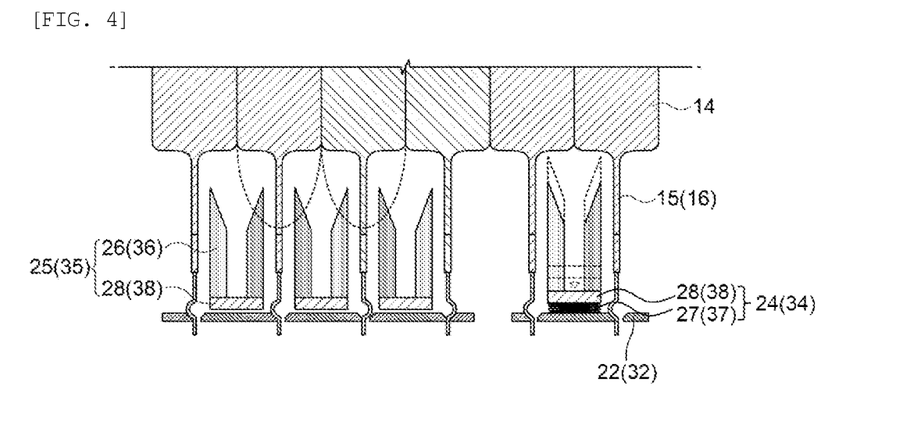
FIGS. 4 and 5 are enlarged cross-sectional views illustrating venting parts according to exemplary embodiments of the present invention.
Figure 5:
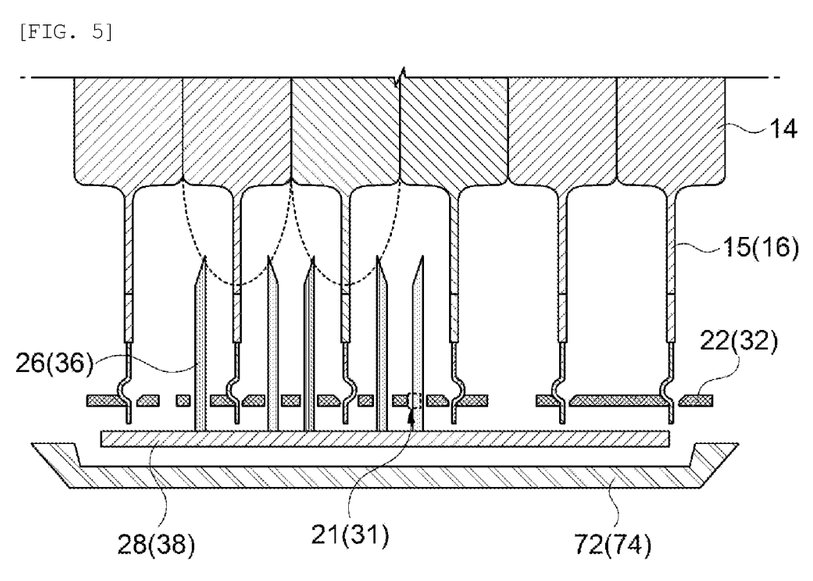

FIGS. 4 and 5 are enlarged cross-sectional views illustrating the venting part according to exemplary embodiments of the present invention.

The venting knives 26 and 36 may protrude from the bus bars 22 and 32 toward the battery cell 14 to form a venting hole in a surface of the battery cell 14 when the battery cell 14 is expanded. Since a gas formed inside the battery cell is discharged through the venting hole, effects of preventing an explosion of the battery module 10 may be improved.

For example, the venting knives 26 and 36 may have a shape including a pointed portion to form the venting hole. As a non-limiting example, the venting knives 26 and 36 may have a knife, chisel, nail or needle shape.

In exemplary embodiments, the venting knives 26 and 36 may protrude from the bus bars 22 and 32 toward the battery cell 14 at an angle of about 30 to 90 degrees with the bus bars 22 and 32. For example, when the venting knives 26 and 36 satisfies the above angular range, since the venting knives are formed toward the battery cell 14, a gap between the venting knives 26 and 36 and the battery cell 14 may be reduced. Thereby, the venting hole may be more quickly formed in the surface of the battery cell 14.

In this case, the venting knives 26 and 36 may be integrally formed with the bus bars 22 and 32. For example, the venting knives 26 and 36 may be integrally formed with the first bus bar 22 or the second bus bar 32. When the venting knives 26 and 36 are integrally formed with the bus bars 22 and 32, the bus bars 22 and 32 also perform a function of supporting the venting knives 26 and 36 instead of a knife support part to be described below, thereby it is possible to form the venting hole in the surface of the battery cell 14 with higher reliability.

For example, the venting knives 26 and 36 may be coupled with the bus bars 22 and 32 as a separate component.

In exemplary embodiments, the venting knives 26 and 36 may be directly coupled to the bus bars 22 and 32.

In exemplary embodiments, the venting parts 25 and 35 may further include knife support parts 28 and 38 for supporting the venting knives 26 and 36. The knife support parts 28 and 38 may be fixed to inner surfaces of the bus bars 22 and 32. The knife support parts 28 and 38 may fix the venting knives 26 and 36. Thereby, when the battery cell 14 is expanded, the venting hole may be formed in the surface of the battery cell 14 with higher reliability by the venting knives 26 and 36 securely fixed thereto.

In the present disclosure, an inner side of the bus bars 22 and 32 refers to a side on which the battery cell 14 is disposed, and an outer side refers to a side opposite thereto.

For example, the knife support parts 28 and 38 may be integrally formed with the bus bars 22 and 32. When the knife support parts 28 and 38 are integrally formed with the bus bars 22 and 32, for example, the support function of the knife support parts 28 and 38 may be improved. Thereby, when the battery cell 14 is expanded, the venting hole may be formed in the surface of the battery cell 14 with higher reliability by the venting knives 26 and 36 securely fixed thereto.

For example, the knife support parts 28 and 38 may be coupled with the bus bars 22 and 32 as a separate component.

The bus bars 22 and 32 may include slits 21 and 31 into which the venting knives 26 and 36 can be inserted. The venting parts 25 and 35 may be coupled with the bus bars 22 and 32 so that the knife support parts 28 and 38 are located on outer surfaces of the bus bars 22 and 32, and the venting knives 26 and 36 pass through the slits 21 and 31 to protrude toward the battery cell 14.

For example, the venting parts 25 and 35 may be coupled with the first bus bar 22 or the second bus bar 32 so that the venting knives 26 and 36 pass through the slits 21 and 31 to protrude toward the battery cell 14. In this case, the front and rear covers 72 and 74 are coupled to rear surfaces of the venting parts 25 and 35 to support and fix the venting parts 25 and 35.

Figure 6:
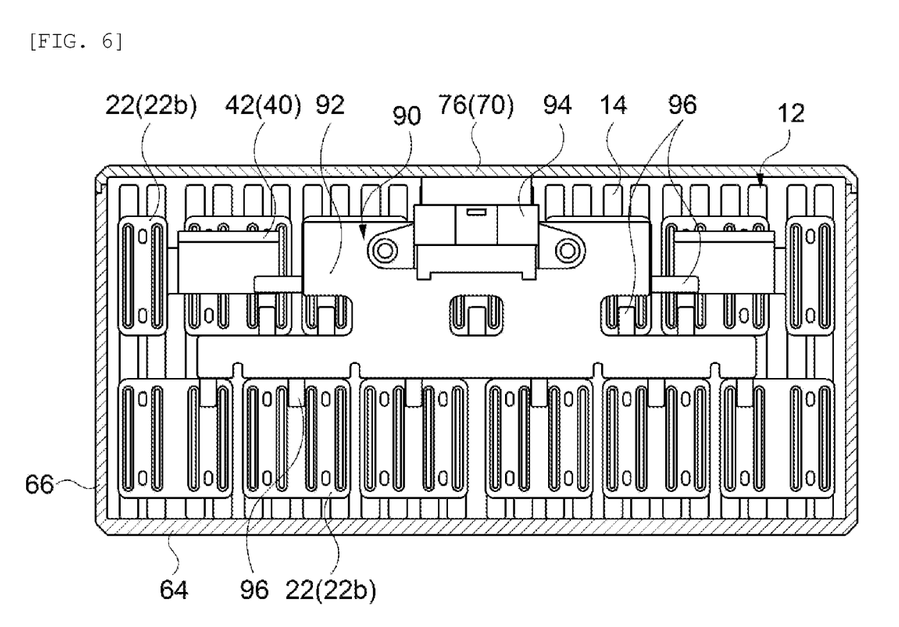
FIG. 6 is a front view illustrating the battery module according to an embodiment of the present invention.

FIG. 6 is a front view of the battery module according to an embodiment of the present invention.

The battery module 10 may include a sensing unit 90. The sensing unit 90 may detect states of the battery cells 14. The sensing unit 90 may detect various information such as voltage, temperature, and pressure of the battery cells 14. The sensing unit 90 may be connected to a temperature sensor 98 disposed inside the battery module 10 to monitor temperature information of the battery cells 14.

For example, the sensing unit 90 may include a pressure sensor for detecting the pressure in the battery cells 14. Thereby, an increase or decrease in the pressure inside the battery cells 14 may be recognized early by a user. When the pressure inside the battery cell 14 is increased, it is possible to effectively prevent the battery module 10 from exploding by stopping the use of the battery module 10.

For example, the battery module 10 may further include a signal transmission unit which transmits a pressure exceeding signal to the user when the pressure in the battery cell 14 measured by the pressure sensor exceeds a primary designated pressure.

For example, the signal transmission unit performs a function of transmitting to the user that the pressure of the battery cell 14 has been increased before the venting hole is formed in the surface of the battery cell 14 by the venting knives 26 and 36, such that it is possible to induce an appropriate action of the user for decreasing the pressure in the battery cell 14.

In this case, the pressure in the battery cell 14 may be decreased before the venting hole is formed. Accordingly, it is possible to prevent a reduction in use life-span of the battery cell 14 due to the formation of the venting hole, and to prevent a decrease in economic efficiency due to the replacement of the battery cell 14 in which the venting hole is formed.

For example, the primary designated pressure may be a pressure higher than a normal internal pressure of the battery cell 14, and may mean an internal pressure range capable of decreasing the internal pressure of the battery cell 14 through the action of the user.

In addition, the battery module 10 may further include actuation parts 24 and 34 which are located between the bus bars 22 and 32 and the battery stack 12, and are configured to further protrude the venting knives 26 and 36 toward the battery cell 14, when the pressure in the battery cell 14 measured by the pressure sensor exceeds a secondary designated pressure having a value greater than the primary designated pressure.

For example, the actuation parts 24 and 34 may protrude the venting knives 26 and 36 toward the battery cell 14 by using an elastic force. Specifically, the actuation parts 24 and 34 may protrude the venting knives 26 and 36 toward the battery cell 14 by introducing air into the actuation parts 24 and 34.

For example, the secondary designated pressure may be a pressure higher than the normal internal pressure of the battery cell 14 and the primary designated pressure, and may mean an internal pressure range of the battery cell 14 which requires formation of the venting hole to prevent the explosion.

In the battery module according to exemplary embodiments of the present invention, when the battery module 10 includes the actuation parts 24 and 34, knife support parts 28 and 38 may be included in the actuation parts 24 and 34.

For example, the actuation parts 24 and 34 may include elastic members 27 and 37 and knife support parts 28 and 38. For example, the elastic members 27 and 37 may include a spring or the like. For example, the elastic members 27 and 37 are relaxed when the internal pressure of the battery cell 14 is increased to allow the venting knives 26 and 36 to be moved toward the battery cell 14.

For example, the knife support parts 28 and 38 may perform a function of supporting the venting knives 26 and 36 so that the venting knives 26 and 36 may be moved in a predetermined direction by the elastic members 27 and 37.

For example, when the pressure in the battery cell 14 detected by the pressure sensor is increased above a specific pressure compared to the existing pressure, electrical signals may be transmitted to the actuation parts 24 and 34. Thereby, as the elastic members 27 and 37 of the actuation parts 24 and 34, which have been fixed, may be relaxed to allow the venting knives 26 and 36 to be moved toward the battery cell 14. In this case, a gap between the venting knives 26 and 36 and the battery cell 14 is decreased, such that a venting hole may be formed in the surface of the battery cell 14 early, and thereby quickly preventing explosion of the battery module 10.

For example, the sensing unit 90 may include a gas detection sensor which detects a gas flowing out from the venting hole formed by the venting parts 25 and 35. For example, the gas detection sensor may include a carbon dioxide ($CO_2$) detection sensor.

For example, since the gas detection sensor detects the gas flowing out of the venting hole early, the user of the battery module 10 may recognize that the venting hole is formed in the surface of the battery cell 14 early. Accordingly, stability of the battery module 10 may be improved.

For example, the gas detection sensor may be coupled to the bus bar assemblies 20 and 30. Specifically, the gas detection sensor may be coupled to at least one of the first bus bar assembly 20 and the second bus bar assembly 30.

In this case, the gas detection sensor may be coupled to upper ends of the bus bar assemblies 20 and 30. For example, the gas detection sensor may be coupled to the upper end of at least one of the first bus bar assembly 20 and the second bus bar assembly 30. Accordingly, the bus bars 22 and 32 and the gas detection sensor may be located adjacent to each other.

For example, when the gas detection sensor is coupled to the upper end of the bus bar assemblies 20 and 30, the fact that the venting hole is formed in the surface of the battery cell 14 by the venting knives 26 and 36 included in the bus bars 22 and 32 may be quickly detected. Thereby, it is possible to cope early with a damage to the battery cell 14 due to the formation of the venting hole, and the stability of the battery module 10 may be improved.

For example, the sensing unit 90 may include a circuit board 92 mounted on the bus bar assemblies 20 and 30. The circuit board 92 may include a circuit for sensing the states of the battery cells 14 and a gas leaked from the venting hole.

The circuit board 92 may include a connector 94 and a plurality of connection parts 96. The connector 94 may be provided to transmit status information of a plurality of battery cells 14 to the outside. A transmission connector may be coupled to the connector 94 of the circuit board 92, and may transmit the status information to the outside through a wire connected to the transmission connector.

The plurality of connection parts 96 are connected to the circuit board 92 and may have a plurality of leg shapes. The plurality of connection parts 96 may be electrically connected to at least one of the first and second bus bars 22 and 32. The plurality of connection parts 96 may be connected to the bus bars 22 and 32 to collect status information of the battery cell 14 and transmit it to the circuit board 92.

DESCRIPTION OF REFERENCE NUMERALS

10: Battery module
12: Battery stack
14: Battery cell
20, 30: Bus bar assembly
22, 32: Bus bar
26, 36: Venting knife
40, 50: Terminal
42, 52: Cathode terminal
44, 54: Anode terminal
60: Module case
62: Case body
70: Case cover
90: Sensing unit

What is claimed is:

1. A battery module comprising:
   a battery stack including a plurality of battery cells stacked, each of the plurality of battery cells having an electrode tab;
   a bus bar coupled to the electrode tabs of at least two of the plurality of battery cells;
   a cutter support part positioned adjacent to the bus bar, the cutter support part including an inner face and an outer face opposite to the inner face; and
   a cutter protruding from the cutter support part toward a battery cell of the plurality of battery cells,
   wherein the outer face of the cutter support part faces the bus bar.

2. The battery module according to claim 1, wherein the cutter is positioned between the electrode tabs of adjacent two battery cells of the plurality of battery cells.

3. The battery module according to claim 2, wherein the cutter includes a pair of venting knives positioned between the electrode tabs of the adjacent two battery cells.

4. The battery module according to claim 1, wherein the cutter support part is integrally formed with the bus bar.

5. The battery module according to claim 1, further comprising a sensing unit configured to monitor states of the plurality of battery cells.

6. The battery module according to claim 5, wherein the sensing unit comprises a pressure sensor which senses a pressure in the plurality of battery cells.

7. The battery module according to claim 6, further comprising a signal transmission unit which transmits a pressure exceeding signal to a user, when the pressure in the plurality of battery cells measured by the pressure sensor exceeds a primary designated pressure.

8. The battery module according to claim 5, wherein the sensing unit further comprises a gas detection sensor which detects a gas leaked from a venting hole formed by the venting part.

9. The battery module according to claim 1, further comprising:
   a pressure sensor sensing a pressure of an inside of a battery cell of the battery stack; and
   an actuation part positioned between the bus bar and the cutter support part,
   wherein when a pressure measured by the pressure sensor is greater than a designated pressure, the actuation part pushes the cutter towards the battery stack.

10. The battery module according to claim 9, wherein the actuation part includes an elastic member positioned between the bus bar and the cutter, the actuation part being coupled to both the bus bar and the cutter support part.

11. The battery module according to claim 10, further comprising the elastic member connecting the cutter support part and the bus bar,
    wherein when the pressure in the battery cell measured by the pressure sensor exceeds a secondary designated pressure having a value greater than a primary designated pressure, the elastic member is relaxed.

12. The battery module according to claim 11, wherein when the elastic member is relaxed, the cutter moves towards the battery cell.

13. The battery module according to claim 10, wherein the elastic member is relaxed and pushes the cutter towards the battery cell when the pressure is greater than the designated pressure.

14. The battery module according to claim 1, wherein the cutter includes:
    a long face extending from an inner face of the cutter support part towards the battery cell;
    a short face extending from the inner face towards the battery cells; and
    a slant face extending from an end of the short face to an end of the long face.

15. The battery module according to claim 14, wherein a portion in which the long face and the slant face meet is pointed.

16. The battery module according to claim 14, wherein a length of the long face is greater than a length of the short face, with reference to a direction in which the cutter extends.

17. The battery module according to claim 14, wherein the cutter includes a pair of venting knives positioned between the electrode tabs of adjacent two battery cells of the plurality of battery cells,
    wherein the long faces of the pair of venting knives face the electrode tabs of the adjacent two battery cells respectively.

18. The battery module according to claim 17, wherein the short faces of the pair of venting knives face each other.

19. A battery module comprising:
    a battery stack including a plurality of battery cells stacked, each of the plurality of battery cells having an electrode tab;

a bus bar coupled to the electrode tabs of at least two of the plurality of battery cells;

a cutter support part positioned adjacent to the bus bar, the cutter support part including an inner face and an outer face opposite to the inner face; and a cutter protruding from the inner face of the cutter support part toward a battery cell of the plurality of battery cells, wherein the bus bar includes a slit into which the cutter is inserted, and wherein the cutter passes through the slit and protrudes toward the battery cell.

20. The battery module according to claim 19, further comprising a cover coupled to the cutter support part, wherein the cutter support part is positioned between the bus bar and the cover.

* * * * *